(12) United States Patent  (10) Patent No.: US 6,704,498 B2
Lawther  (45) Date of Patent: Mar. 9, 2004

(54) CAMERA FOR FORMING SIMULTANEOUS IMAGES COVERING DIFFERENT AREAS OF THE SAME SUBJECT

(75) Inventor: Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 32 days.

(21) Appl. No.: 10/180,718

(22) Filed: Jun. 26, 2002

(65) Prior Publication Data

US 2004/0001709 A1 Jan. 1, 2004

(51) Int. Cl.[7] ............................................... G03B 41/00
(52) U.S. Cl. ........................................ 396/6; 396/333
(58) Field of Search ........................... 396/6, 323, 324, 396/326, 333, 85, 88

(56) References Cited

U.S. PATENT DOCUMENTS

| 4,943,825 A | 7/1990 | Taniguchi et al. | |
| 5,294,951 A | * 3/1994 | Lo | 396/323 |
| 5,400,097 A | 3/1995 | Okoyama | |
| 5,479,229 A | * 12/1995 | Minamikawa | 396/323 |
| 5,666,580 A | 9/1997 | Ito et al. | |
| 5,752,111 A | 5/1998 | Morton | |
| 5,852,753 A | 12/1998 | Lo et al. | |

* cited by examiner

Primary Examiner—David M. Gray
(74) Attorney, Agent, or Firm—Roger A. Fields

(57) ABSTRACT

A camera has a wide-angle taking lens and a telephoto taking lens for forming simultaneous wide-angle and telephoto images of the same subject, to make wide-angle and telephoto simultaneous exposures on a single frame of film. A wide-angle/telephoto selection indicator is supported for movement between the taking lenses and the frame of film to prevent either the wide-angle or telephoto image from being fully exposed on the frame of film. Thus, one of the simultaneous exposures is provided with an indication that it is not to be printed as a picture.

9 Claims, 5 Drawing Sheets

CAMERA FOR FORMING SIMULTANEOUS IMAGES COVERING DIFFERENT AREAS OF THE SAME SUBJECT

FIELD OF THE INVENTION

The invention relates generally to photographic cameras, and in particular to a camera that has a plurality of taking lenses lens for forming simultaneous images of the same subject that cover different areas of the subject.

BACKGROUND OF THE INVENTION

Camera having a plurality of taking lenses lens for forming simultaneous images of the same subject that cover different areas of the subject are known. Prior art U.S. Pat. No. 5,400,097 issued Mar. 21, 1995 discloses a camera that has a wide-angle taking lens and a telephoto taking lens for forming simultaneous wide-angle and telephoto images of the same subject to make wide-angle and telephoto simultaneous exposures on a single frame of film. Both of the exposures are intended to be printed to make pictures.

SUMMARY OF THE INVENTION

Generally speaking, a camera comprising a plurality of taking lenses for forming simultaneous images of the same subject that cover different areas of the subject, is characterized in that:

a selection indicator for indicating that only one of the areas of the subject is to be included in a picture, is supported for movement with respect to the lenses to allow only one of the images to be fully exposed on film, whereby the one image that is fully exposed on film is of the area of the subject to be included in the picture.

More specifically, a camera comprising a wide-angle taking lens and a telephoto taking lens for forming simultaneous wide-angle and telephoto images of the same subject to make wide-angle and telephoto simultaneous exposures on a single frame of film, is characterized in that:

a wide-angle and telephoto selection indicator is supported for movement between the taking lenses and the frame of film to prevent either the wide-angle or telephoto image from being fully exposed on the frame of film, whereby one of the simultaneous exposures is provided with an indication that it is not to be printed as a picture.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
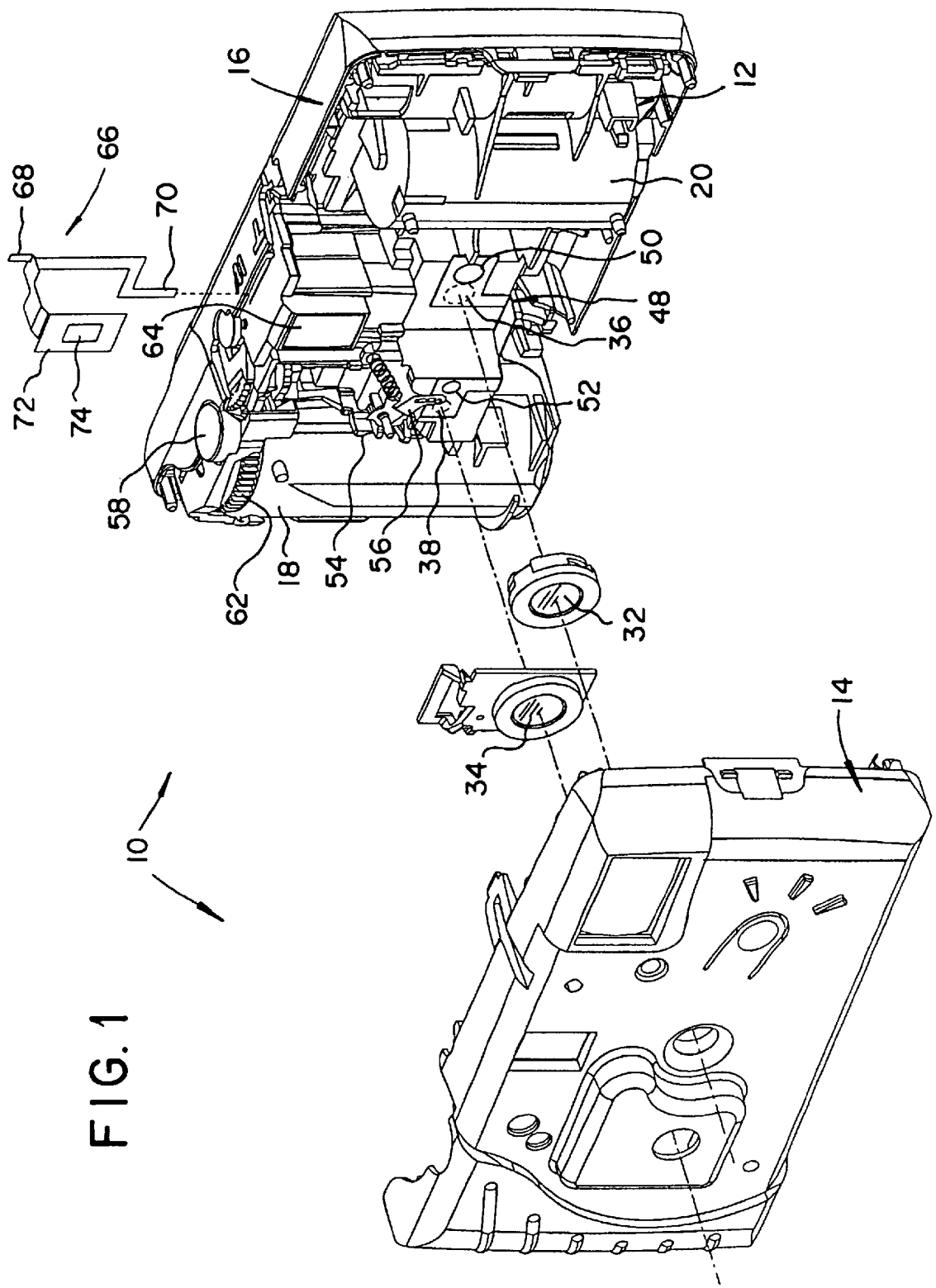
FIG. 1 is a front exploded view of a camera for simultaneously making a wide-angle exposure and a telephoto exposure of the same subject and for indicating which one of the two exposures is to be used to print a picture, according to a preferred embodiment of the invention.

Referring now to the drawings, FIG. 1 shows a disposable one-time-use camera 10 including an opaque main body part 12, an opaque front cover part 14, and an opaque exterior rear cover part 16. The front cover part 14 and the rear cover part 16 house the main body part 12 between them and are connected releasably to one another and to the main body part 12 via known-type hook-in-hole and other connections.

Figure 3:
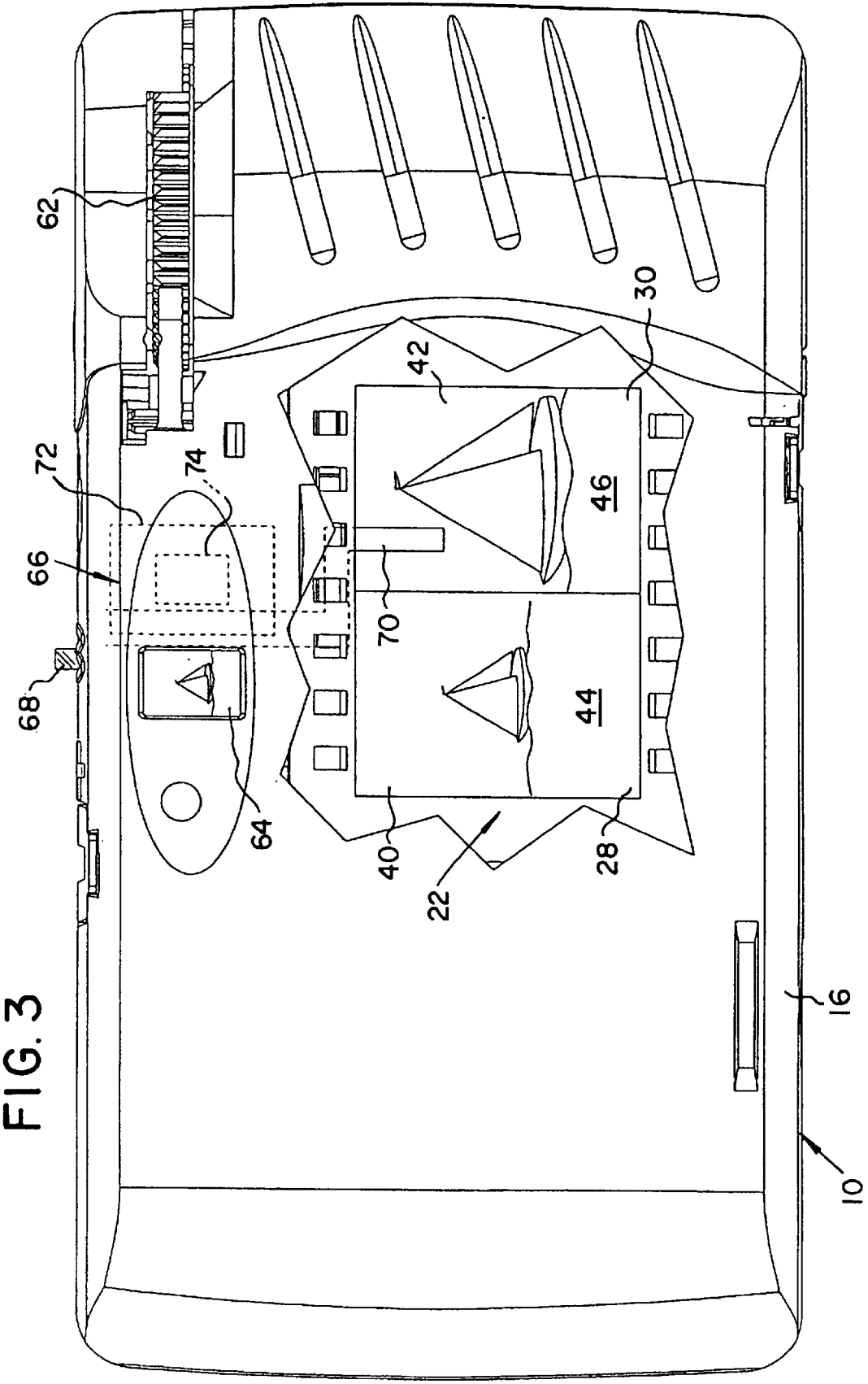
FIG. 3 is a rear elevation view similar to FIG. 2 showing latent images of the wide-angle and telephoto exposures with the selection indicator partially obscuring the telephoto exposure.

The main body part 12 has a rearwardly open cartridge receiving chamber 18 for a conventional 35 mm film cartridge (not shown) and a rearwardly open film supply chamber 20 for an unexposed film roll (not shown) on a rotatable film supply spool (not shown). During assembly of the camera 10, a filmstrip 22, shown in FIG. 3, is substantially prewound from a rotatable film winding spool in the film cartridge and into the unexposed film roll on the film supply spool. A pair of adjacent rearwardly-open exposure chambers 24 and 26 are located between the cartridge receiving chamber 18 and the film supply chamber 20 for simultaneously exposing successive pairs of half-frames 28 and 30 of the filmstrip 22, shown in FIG. 3, when ambient light is received through front fixed-focus taking lenses 32 and 34 mounted on the main body part 12 and through exposure apertures 36 and 38 in the main body part. Each pair of half-frames 28 and 30 are 24 mm×18 mm, to together constitute a single 24 mm×36 mm full-frame.

The taking lens 32 is a wide-angle lens having a relatively short focal length, e.g. 23 mm, and the taking lens 34 is a telephoto lens having a longer focal length, e.g. 36 mm. Similarly, the exposure aperture 36 has a larger diameter opening than the exposure aperture 38. The taking lenses 32 and 34 form simultaneous wide-angle and telephoto images 40 and 42 of the same subject, to make simultaneous wide-angle and telephoto exposures 44 and 46 on a pair of half-frames 28 and 30 of the filmstrip 22. As can be seen in FIG. 3, the wide-angle image 40 covers a greater area of the subject than the telephoto image 42.

As shown in FIG. 1, a single-blade shutter 48 is mounted on the main body part 12, between the taking lenses 32 and 34 and the exposure apertures 36 and 38, to be translated from a normal covering position in which the shutter light-tightly covers the exposure apertures to a momentary uncovering position in which relatively large and small holes 50 and 52 in the shutter align with the exposure apertures and then back to the covering position. A known-type high-energy striker 54 is mounted on the main body part 12 to strike against a lever 56 mounted on the main body part and connected to the shutter 48, when a shutter release button 58 on the main body part 12 is manually depressed. The lever 56 then pivots clockwise in FIG. 1 to move the shutter 48 from its covering position to its uncovering position. A return spring 60 pivots the lever 56 counterclockwise in FIG.

1 to return the shutter 48 from its uncovering position to its covering position.

Figure 2:
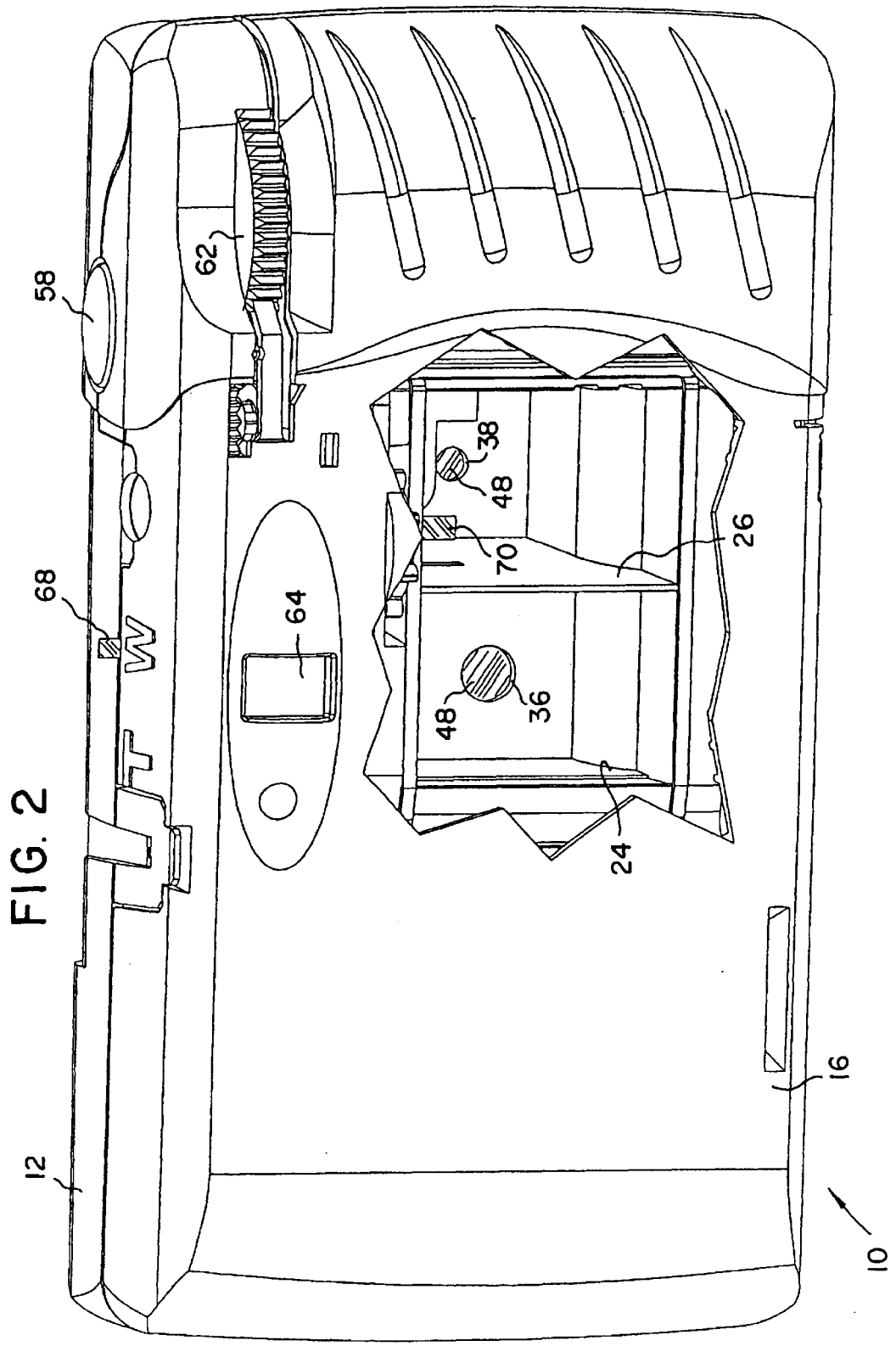
FIG. 2 is a rear elevation view of the camera showing a back cover part of the camera partially cut away to reveal respective interior chambers for making the wide-angle and telephoto exposures and showing a wide-angle and telephoto selection indicator in the chamber for making the telephoto exposure.

A known-type film winding thumbwheel 62 coaxially engages the film winding spool in the film cartridge and peripherally protrudes from an elongate narrow opening (not shown), in the rear cover part 16. When the thumbwheel 62 is manually rotated in a film winding direction, i.e. counter-clockwise in FIG. 1, it similarly rotates the film winding spool. This is done in order to wind a pair of half-frames 28 and 30 of the filmstrip 22 into the film cartridge after the simultaneous exposures 44 and 46 are made, and to move a fresh pair of half-frames of the filmstrip from the unexposed film roll to the exposure chambers 24 and 26. See FIGS. 2 and 3.

Figure 4:
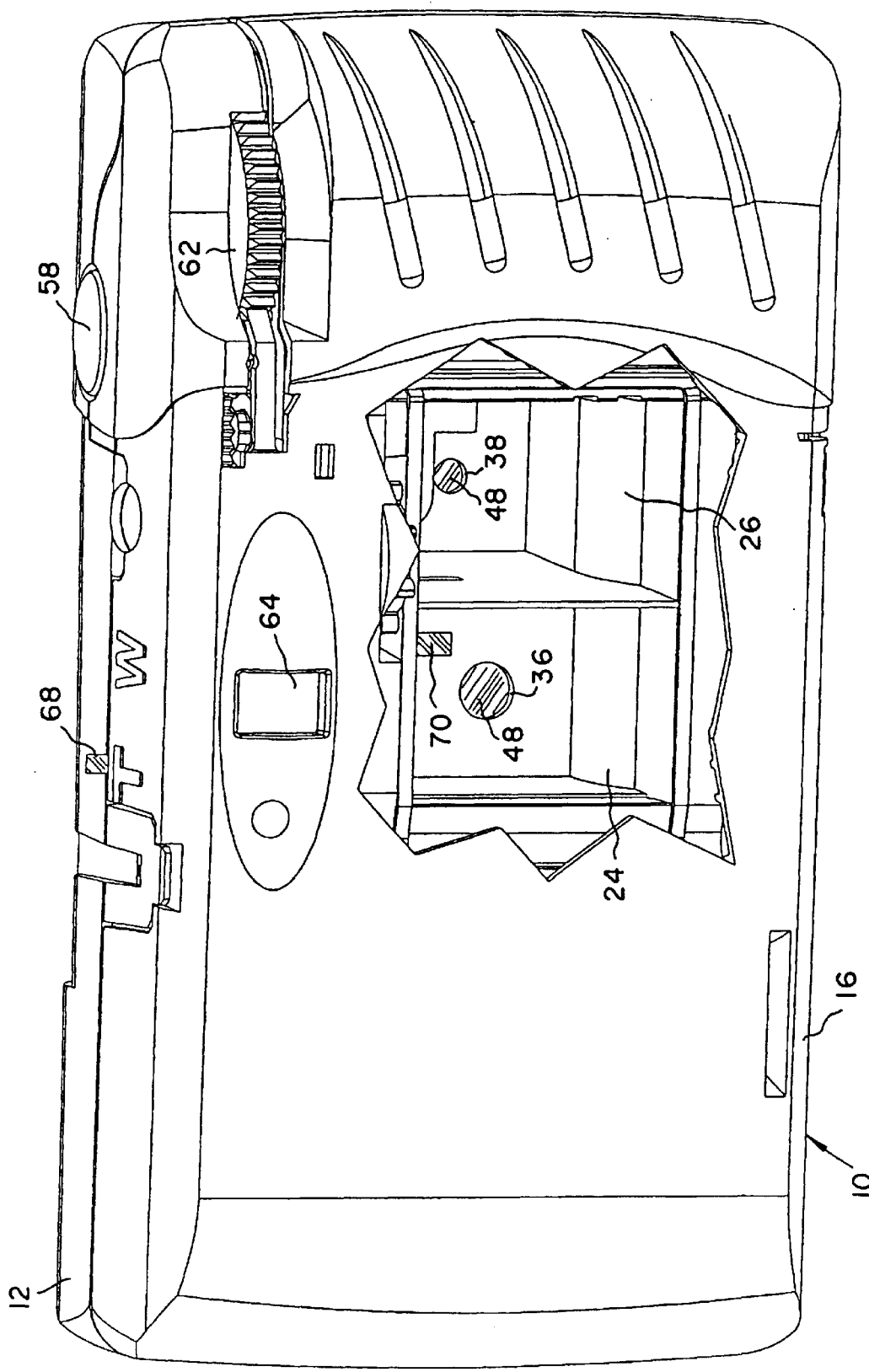
FIG. 4 is a rear elevation view of the camera similar to FIG. 2 showing the wide-angle and telephoto selection indicator in the chamber for making the wide-angle exposure.
Figure 5:
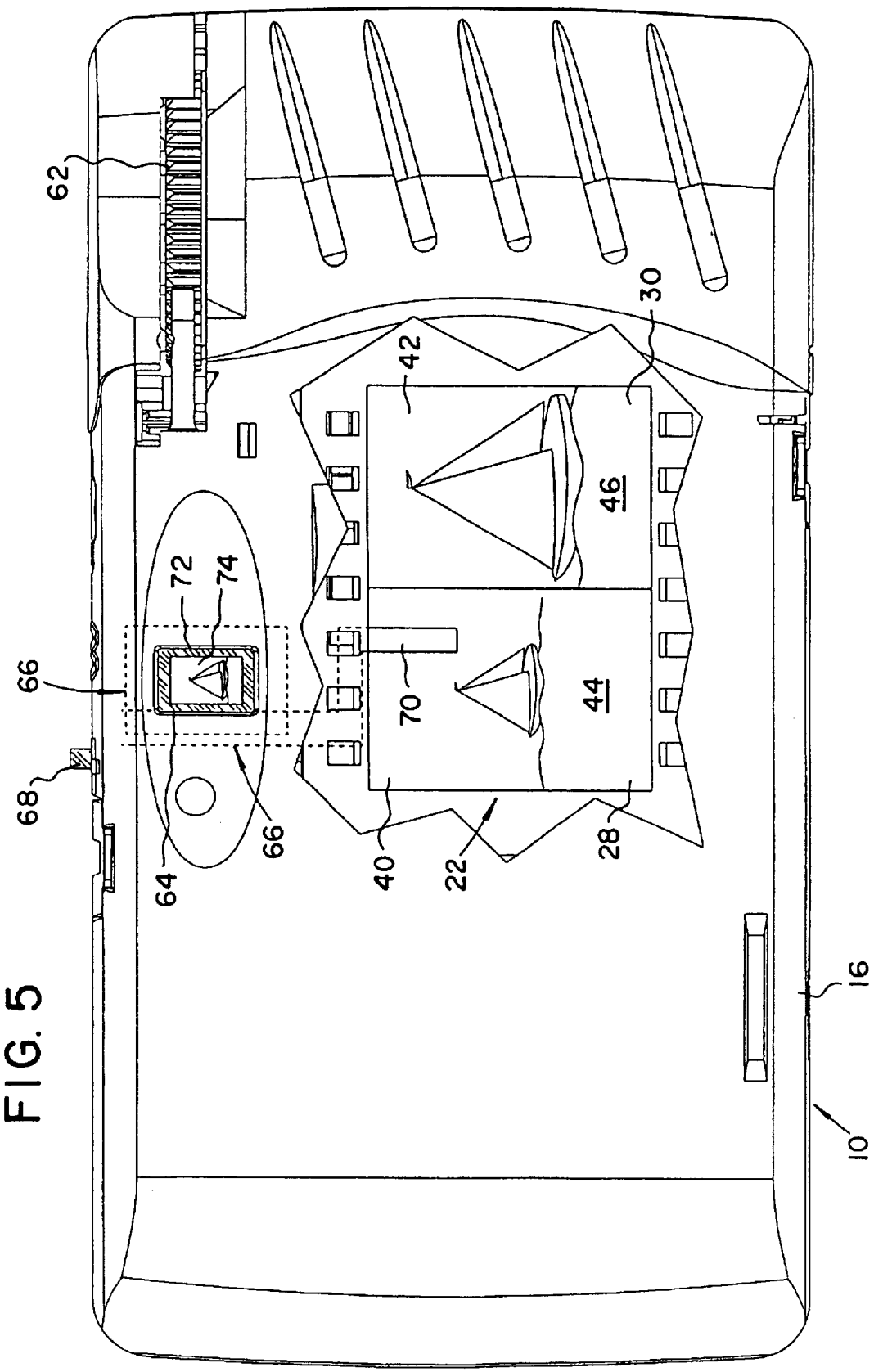
FIG. 5 is a rear elevation view similar to FIG. 4 showing latent images of the wide-angle and telephoto exposures with the selection indicator partially obscuring the wide-angle exposure.

An optical direct-see-through viewfinder 64 is included on the main body part 12 for viewing the wide-angle or telephoto area of the subject to be included in a picture. A wide-angle/telephoto selection indicator 66 is mounted on the main body part 12 to be manually moved between a wide-angle setting shown in FIGS. 2 and 3 and a telephoto setting shown in FIGS. 4 and 5. In the wide-angle setting, a push or thumb tab 68 of the selection indicator 66 is located adjacent a "W" on the main body part 12 and a marker or fogging tab 70 is located in the exposure chamber 26 between the telephoto taking lens 34 and the half-frame 30 to prevent the telephoto image 42 formed by the telephoto taking lens from being fully exposed on the half-frame, i.e. the marker tab partially obscures the telephoto exposure 46. See FIGS. 2 and 3. The partial obscuring of the telephoto exposure 46 is intended to serve as an indication that it is not be used to print a picture. In the telephoto setting, the push or thumb tab 68 of the selection indicator 66 is located adjacent a "T" on the main body part 12 and the marker tab 70 is located in the exposure chamber 24 between the wide-angle taking lens 32 and the half-frame 28 to prevent the wide-angle image 40 formed by the wide-angle taking lens from being fully exposed on the half-frame, i.e. the marker tab partially obscures the wide-angle exposure 44. See FIGS. 4 and 5. The partial obscuring of the wide-angle exposure 44 is intended to serve as an indication that it is not be used to print a picture.

The selection indicator 66 has an opaque mask frame 72 that surrounds a telephoto viewing lens 74. The mask frame 72 and the telephoto viewing lens 74 are located in the viewfinder 64 when the selection indicator 66 is in the telephoto setting. This permits one to view the telephoto area of the subject to be included in the picture. See FIGS. 1 and 5. When the selection indicator 66 is in the wide-angle setting, the mask frame 72 and the telephoto viewing lens 74 are removed from the viewfinder 64. See FIG. 3.

The invention has been described in detail with particular reference to certain preferred embodiments thereof, but it will be understood that variations and modifications can be effected within the spirit and scope of the invention. For example the camera 10 can have more than the two taking 32 and 34.

What is claimed is:

1. A camera comprising a plurality of taking lenses for forming simultaneous images of the same subject that cover different areas of the subject and simultaneously exposing the images on a film, is characterized in that:

a selection indicator for indicating that only one of the areas of the subject is to be included in a picture by indicating that only one of the exposures on the film is to be printed, is supported for movement with respect to said lenses to allow only one of the images to be exposed in full on the film by partially obscuring every other image, whereby the one image that is exposed in full on the film is of the area of the subject to be included in the picture.

2. A camera comprising a plurality of taking lenses for forming simultaneous images of the same subject that cover different areas of the subject, is characterized in that:

said taking lenses have shorter and longer focal lengths to cover different areas of the subject; and a selection indicator for indicating that only one of the areas of the subject is to be included in a picture, is supported for movement with respect to said lenses to allow only one of the images to be fully exposed on film, whereby the one image that is fully exposed on film is of the area of the subject to be included in the picture.

3. A camera comprising a wide-angle taking lens and a telephoto taking lens for forming simultaneous wide-angle and telephoto images of the same subject to make wide-angle and telephoto simultaneous exposures on a single frame of film, is characterized in that:

a wide-angle and telephoto selection indicator is supported for movement between said taking lenses and the frame of film to prevent either the wide-angle or telephoto image from being fully exposed on the frame of film, whereby one of the simultaneous exposures is provided with an indication that it is not to be printed as a picture.

4. A camera as recited in claim 3, wherein a viewfinder shows the area of the subject to be included in the picture, and said wide-angle and telephoto selection indicator is movable in said viewfinder to alternate between a wide-angle view of the subject and a telephoto view of the subject.

5. A camera as recited in claim 3, wherein said wide-angle lens has a focal length of 23 mm, and said telephoto lens has a focal length of 36 mm.

6. A camera as recited in claim 3, wherein the wide-angle and telephoto simultaneous exposures on a single frame of film are each a half-frame exposure.

7. A camera comprising a wide-angle taking lens and a telephoto taking lens for forming simultaneous wide-angle and telephoto images of the same subject to make wide-angle and telephoto simultaneous exposures on a single frame of film, is characterized in that:

means for preventing either the wide-angle or telephoto image from being fully exposed on the frame of film, whereby one of the simultaneous exposures is provided with an indication that it is not to be printed as a picture.

8. A method in a camera, comprising the steps:

making simultaneous exposures of the same subject on a film, but that cover different areas of the same subject; and indicating which one of the exposures on the film is to be used to print a picture of the subject.

9. A method in a camera, comprising the steps:

making simultaneous exposures of the same subject on a film, but that cover different areas of the same subject; and indicating which one of the exposures on the film is to be used to print a picture, by partially obscuring every exposure on the film not to be used to print a picture of the subject.

* * * * *